(12) United States Patent
Lekutai et al.

(10) Patent No.: US 11,095,418 B2
(45) Date of Patent: *Aug. 17, 2021

(54) MITIGATING INTERFERENCE BETWEEN BASE STATIONS AND MICROWAVE BACKHAUL TRANSCEIVERS

(71) Applicant: T-Mobile USA, Inc., Bellevue, WA (US)

(72) Inventors: Gaviphat Lekutai, Kirkland, WA (US); Brian Allan Olsen, Bellevue, WA (US); Alan Denis MacDonald, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,894

(22) Filed: Jul. 21, 2020

(65) Prior Publication Data

US 2021/0111854 A1 Apr. 15, 2021

Related U.S. Application Data

(63) Continuation of application No. 16/598,097, filed on Oct. 10, 2019, now Pat. No. 10,728,009.

(51) Int. Cl.
*H04L 5/00* (2006.01)
*H04W 72/04* (2009.01)
(Continued)

(52) U.S. Cl.
CPC ....... *H04L 5/0073* (2013.01); *H04W 36/0072* (2013.01); *H04W 72/048* (2013.01); *H04W 72/0453* (2013.01); *H04W 72/082* (2013.01)

(58) Field of Classification Search
CPC ............ H04L 5/0073; H04W 72/0453; H04W 72/048; H04W 72/082; H04W 36/0072
(Continued)

(56) References Cited

U.S. PATENT DOCUMENTS

2002/0028675 A1  3/2002  Schmutz et al.
2008/0090575 A1  4/2008  Barak et al.
(Continued)

OTHER PUBLICATIONS

Office Action for U.S. Appl. No. 16/598,135, dated Jan. 25, 2021, Lekutai, "Detecting Interference Between Base Stations and Microwave Backhaul Transceivers", 12 Pages.
(Continued)

*Primary Examiner* — Joel Ajayi
(74) *Attorney, Agent, or Firm* — Lee & Hayes, P.C.

(57) ABSTRACT

Techniques for detecting and/or mitigating interference in a wireless network are discussed herein. An environment may include a base station in communication with one or more user equipment (UE) and one or more microwave backhaul transceivers. In some examples, the base station may and transceivers may communicate using frequencies in the same band (e.g., a millimeter frequency band). A geometry of devices in an environment can be determined. Further, interference can be detected based on a flexible portion of a transmission or a source identifier that can be included in a transmission. In some examples, the microwave backhaul transceivers may communicate via a same or similar millimeter frequency resources. Wireless resource(s) can be selected or otherwise determined for one or more components of the network to mitigate interference in the network.

19 Claims, 10 Drawing Sheets

(51) Int. Cl.
*H04W 36/00* (2009.01)
*H04W 72/08* (2009.01)

(58) Field of Classification Search
USPC .................................................. 455/438, 450
See application file for complete search history.

(56) References Cited

U.S. PATENT DOCUMENTS

| | | |
|---|---|---|
| 2010/0190533 A1 | 7/2010 | Black et al. |
| 2014/0106688 A1 | 4/2014 | Negus et al. |
| 2014/0185497 A1 | 7/2014 | Wolf et al. |
| 2014/0301251 A1 | 10/2014 | Chen et al. |
| 2016/0056907 A1 | 2/2016 | Wei et al. |
| 2016/0066288 A1 | 3/2016 | Feng et al. |
| 2016/0135132 A1 | 5/2016 | Donepudi et al. |
| 2016/0183232 A1 | 6/2016 | Stirling-Gallacher et al. |
| 2016/0219584 A1 | 7/2016 | Bertrand et al. |
| 2016/0269097 A1 | 9/2016 | Islam et al. |
| 2016/0309490 A1 | 10/2016 | Huang et al. |
| 2017/0054545 A1 | 2/2017 | Negus et al. |
| 2017/0078077 A1 | 3/2017 | Hessler et al. |
| 2017/0127456 A1 | 5/2017 | Tsuda |
| 2017/0208588 A1 | 7/2017 | Park et al. |
| 2017/0208602 A1 | 7/2017 | Ling |
| 2017/0215091 A1 | 7/2017 | Ling |
| 2017/0273065 A1 | 9/2017 | Stirling-Gallacher et al. |
| 2017/0332300 A1 | 11/2017 | Choi et al. |
| 2017/0346525 A1 | 11/2017 | Stirling-Gallacher et al. |
| 2018/0014213 A1 | 1/2018 | Bennett et al. |
| 2018/0027555 A1 | 1/2018 | Kim et al. |
| 2018/0324742 A1 | 11/2018 | Agarwal et al. |
| 2019/0014486 A1 | 1/2019 | Ling |
| 2019/0028908 A1 | 1/2019 | Ling |
| 2019/0068237 A1 | 2/2019 | Stirling-Gallacher et al. |
| 2019/0109675 A1 | 4/2019 | Chen et al. |
| 2019/0190565 A1 | 6/2019 | Negus et al. |
| 2019/0190636 A1 | 6/2019 | Kim et al. |
| 2019/0394799 A1 | 12/2019 | Islam et al. |
| 2020/0145836 A1 | 5/2020 | Smith |
| 2020/0266861 A1 | 8/2020 | Nammi et al. |
| 2020/0288409 A1 | 9/2020 | Li et al. |
| 2020/0358183 A1 | 11/2020 | Tran et al. |
| 2020/0389799 A1 | 12/2020 | Young et al. |
| 2020/0389855 A1 | 12/2020 | Donepudi et al. |
| 2020/0396622 A1 | 12/2020 | Negus et al. |
| 2021/0112550 A1 | 4/2021 | Lekutai et al. |

OTHER PUBLICATIONS

AT&T, "New SID Proposal: Study on Integrated Access and Backhaul for NR", 3GPP TSG RAN, 17, Dec. 2017, 5 pages.

AT&T, "Summary of 7.2.3.1 Enhancements to Support NR backhaul links", 3GPP, Nov. 16, 2018, pp. 1-25.

The Partial European Search Report dated Mar. 12, 2021 for European Patent Application No. 20201159.9, 18 pages.

Nokia, "Inter-IAB Node CLI Measurements", 3GPP, TSG RAN, Dec. 9, 2018, 3 pages.

Samsung, "Updates to TS 38.213", 3GPP RAN WG1, Aug. 11, 2018, 90 pages.

ZTE, "Discussion on Network Coordination Mechanisms for CLI Mitigation", 3GPP TSG RAN WG1, Jan. 20, 2019, 6 pages.

Extended European Search Report dated Jun. 17, 2021 for European Patent Application No. 20201159.9, 15 pages.

1000

```
┌─────────────────────────────────────────────────────────────┐
│ DETERMINE INTERFERENCE ASSOCIATED WITH AT LEAST ONE OF A BASE│
│    STATION, A USER EQUIPMENT, AND/OR A BACKHAUL TRANSCEIVER  │
│                           1002                               │
└─────────────────────────────────────────────────────────────┘
                              │
                              ▼
┌─────────────────────────────────────────────────────────────┐
│ MITIGATE THE INTERFERENCE BY MODIFYING AT LEAST ONE RADIO    │
│ CHARACTERISTIC (E.G., A RADIO ACCESS TECHNOLOGY, A WIRELESS  │
│ CHANNEL, AN ENCODING SCHEME, A POWER LEVEL, A SERVING BASE   │
│                       STATION, ETC.)                         │
│                           1004                               │
└─────────────────────────────────────────────────────────────┘
```

MITIGATING INTERFERENCE BETWEEN BASE STATIONS AND MICROWAVE BACKHAUL TRANSCEIVERS

CROSS REFERENCE TO RELATED APPLICATIONS

This is a continuation application which claims priority to commonly assigned, co-pending U.S. patent application Ser. No. 16/598,097, filed Oct. 10, 2019. Application Ser. No. 16/598,097 is fully incorporated herein by reference.

BACKGROUND

Different techniques can be used to connect remote cellular communications sites ("cell towers") with a core cellular network to provide voice and data connectivity, among other things. Cellular service providers can use wired backhauls to provide backhaul for broadband cellular services and to support the addition of new cell sites to provide additional bandwidth and/or additional wireless coverage.

Service providers can use fiber optic cable, for example, to connect many cell sites to the core network for cellular backhaul. Wired backhauls that utilize fiber and/or copper cabling, however, are expensive and time-consuming to deploy. In many cases, such as for some rural applications, certain small cell deployments, and/or temporarily extending network capacity, it is not cost effective to deploy a wired backhaul. Wireless backhaul such as microwaves can be used as an alternative backhaul to service these cell sites. Microwave backhaul can use high frequency bands such as 70 GHz, 60 GHz, and 28 GHz. As an example, a recent Fifth Generation (5G) technology, namely millimeter wave (mmW), can be allocated in the same 28 GHz band as the microwave. Common coexistence scenario of 28 GHz 5G cell sites and 28 GHz microwave backhauls, often from cross service providers, may create interferences issue.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 10 illustrates an example process for detecting and mitigating interference in a wireless network, as discussed herein.

DETAILED DESCRIPTION

Figure 1:
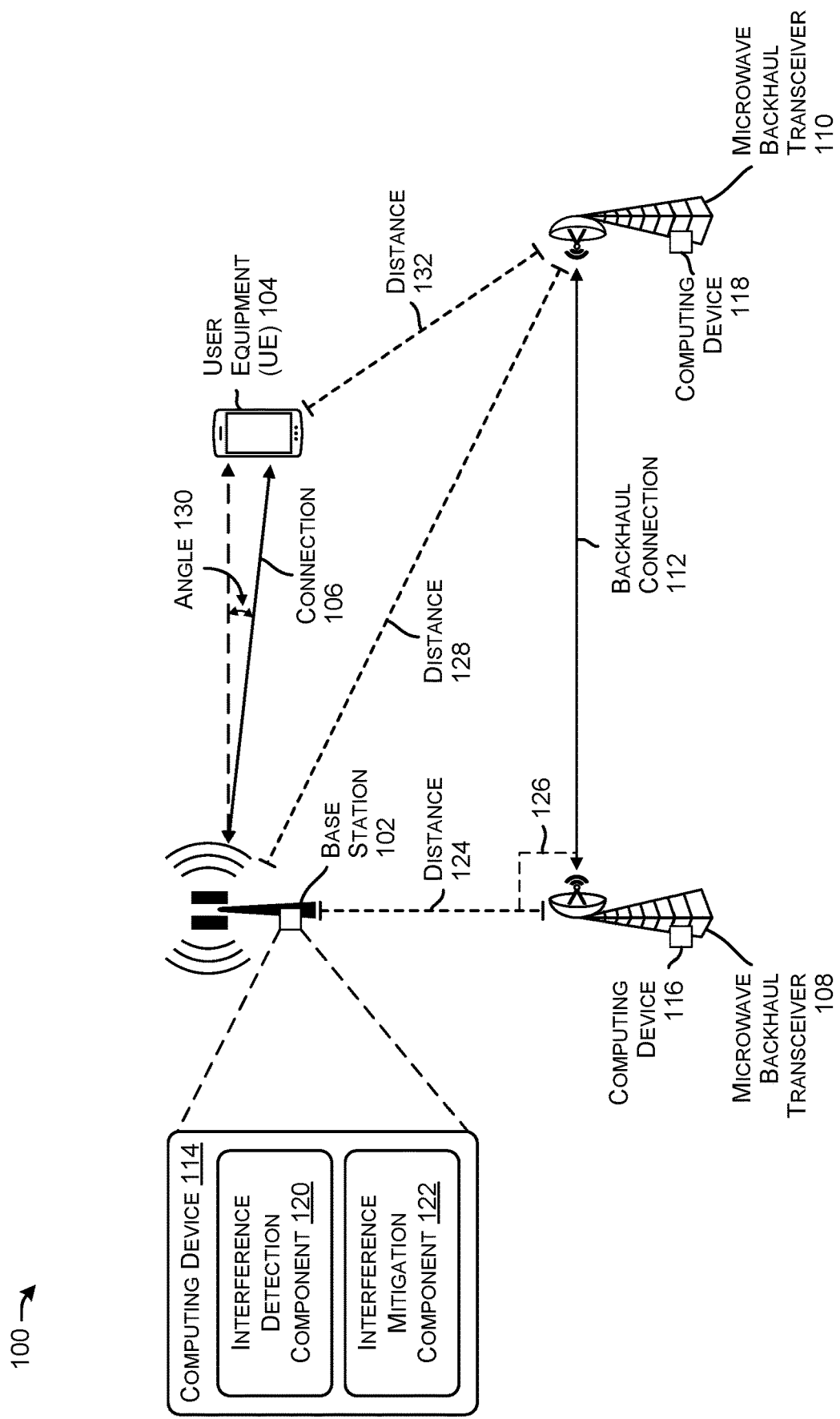
FIG. 1 illustrates an example environment implementing interference detection and/or mitigation techniques according to implementations of the present disclosure.

The systems, devices, and techniques described herein are directed to detecting and/or mitigating interference in a wireless network. For example, a wireless network may include any number of devices such as a base station(s) in communication with one or more user equipment (UE), and one or more microwave backhaul transceivers. In some examples, the base station may comprise a Fifth Generation base station configured to communicate with a UE via a millimeter frequency resource. In some examples, the microwave backhaul transceivers may communicate via a same or similar millimeter frequency resources. Because the base station(s), UE(s), and the microwave backhaul transceiver(s) may use a same or similar frequency resource, the devices may cause interference in some situations. In some examples, interference can be measured to determine an expected interference based on location(s) of various base stations, user equipment, and/or microwave backhaul transceivers in an environment. Based at least in part on locations of the devices in an environment, a wireless resource can be selected or otherwise determined for one or more components of the network to mitigate interference in the network. Further, in some examples, interference can be detected in flexible portions of a wireless communication. Additionally, wireless communication(s) may include an identification of a serving base station, for example, such that when interference is detected (during a flexible portion or otherwise) wireless resources associated with a particular base station, UE, and/or microwave backhaul transceiver can be mitigated.

An environment may include, but is not limited to, a first microwave backhaul transceiver in communication with a second microwave backhaul transceiver. Further, the environment may include a base station (e.g., a 5G base station) in communication with a UE. In some examples, the microwave backhaul transceivers may communicate via a first channel that is adjacent to a second channel used by the base station and the UE. In some examples, the microwave backhaul transceivers, the base stations, and the UEs may use "millimeter wave" frequency resources on the order of 24 GHz-300 GHz. In some examples, a base station may use a channel that is adjacent to a channel used by the microwave backhaul transceivers, which may introduce interference into the wireless networks.

As introduced above, interference can be predicted or otherwise determined based at least in part on a geometry of devices in an environment. Techniques to determine a layout of devices in the environment may include determining a location of the first microwave backhaul transceiver or the second microwave backhaul transceiver as well as a transmission direction associated with the particular microwave backhaul transceiver. Further, techniques may include determining a location of the base station as well as a transmission direction of the communication between the base station and the UE. A distance between the particular microwave backhaul transceiver and the base station can be determined as well as an angle associated with the transmission directions of the microwave backhaul transceiver and the base station. A wireless resource for the microwave backhaul transceiver, the base station, and/or the UE can be based at least in part on the distance(s) between the devices and/or the angle(s) associated with the transmissions. For example, techniques may include selecting a wireless channel, initiating a handover to another radio access technology (e.g., handover from a 5G transmission to a Fourth Generation (4G) transmission), initiating a handover to another base station, and the like.

Techniques to detect interference may include monitoring for interference during a flexible period associated with a wireless communication. For example, the base station and the UE may communicate using time division duplexing (TDD) techniques in accordance with the 5G protocol. In some examples, the base station and the UE can select or otherwise determine a slot format to use for a wireless communication between the base station and the UE. In some examples, a slot format may include an uplink portion, a downlink portion, and/or a flexible portion. In some examples, a slot format may be in accordance with 3GPP Technical Specification 38.213, Table 11.1.1-1. Further, the techniques may further include sending an indication of the slot format to a sensor or computing device associated with the microwave backhaul transceiver, the base station, and/or the UE. The sensor may receive one or more signals in accordance with a wireless transmission. If the signal is received during a flexible portion (e.g., based on the slot format), techniques can include determining that the signal is received as interference at the sensor. Based on a frequency, power, modulation scheme, and the like, techniques can include determining that the signal is interference associated with the microwave backhaul transceiver received at the base station and/or UE. In some examples, techniques can include providing an indication to the transceiver, the base station, the UE, and/or another component to adjust one or more wireless resource to reduce interference.

Techniques to detect interference may further include detecting an identifier in an interfering signal received at a device. For example, in conjunction with a communication between a base station and a UE, the base station may instruct the UE to include an identifier in a transmission by the UE. For example, the base station can transmit an identifier associated with the base station to the UE for the UE to include in a transmission from the UE to the base station. Further, a microwave backhaul transceiver may include a sensor or computing device to detect interference from the UE at the microwave backhaul transceiver. In a case where the signal received at the microwave backhaul transceiver includes the identifier transmitted by the UE, the microwave backhaul transceiver may provide an indication to the base station, the UE, and/or another component to adjust one or more wireless resource to reduce interference.

In some examples, interference at a UE can be inferred or otherwise determined based on transmission characteristics of the UE. For example, interference at a UE can be determined based at least in part on a throughput associated with the UE (and/or a ratio between an actual throughput and a maximum or expected throughput), a signal to interference plus noise ratio (SINR), received signal strength indication (RSSI), reference signal received power (RSRP), reference signal received quality (RSRQ), uplink transmission power, and the like.

As noted above, interference can be based at least in part on location(s) of device(s) in an environment and/or on interference received and/or detected at a base station, UE, and/or a microwave backhaul transceiver. Further, such interference can be mitigated using a number of techniques. For example, interference can be mitigated by varying one or more wireless resources of the microwave backhaul transceiver, the base station, and/or the UE, including but not limited to a wireless channel (e.g., changing channels to introduce a guard band (or to increase a size of a guard band) between transmissions), a radio access technology (e.g., handing over from a 5G base station at a location to a 4G base station at the same location), a serving cell (e.g., handing over from a first base station associated with a first location to a second base station associated with a second location), varying a power or modulation scheme, and the like.

In some examples, a base station of the present disclosure can be configured for dual connectivity (e.g., EN-DC (E-UTRA-NR Dual Connectivity), NR-DC (New Radio Dual Connectivity), NGEN-DC (NG-RAN-E-UTRA Dual Connectivity) and/or NE-DC (NR-E-UTRA Dual Connectivity). By way of example and without limitation, an environment can include a first base station (e.g., a 4G base station) and a second base station (e.g., a 5G base station) configured to provide Non-Standalone Access (NSA) connections to UEs capable of such dual connectivity. In some examples, the base stations discussed herein can use frequency resources in at least one of an LTE or 5G Band 71 (e.g., a 600 MHz band), an LTE Band 48 (e.g., 3500 MHz), and the like. In some instances, the frequency resources can include, but are not limited to, LTE or 5G Band 1 (e.g., 2080 MHz), LTE or 5G Band 2 (1900 MHz), LTE or 5G Band 3 (1800 MHz), LTE Band 4 (1700 MHz), LTE or 5G Band 5 (850 MHz), LTE or 5G Band 7 (2600 MHz), LTE or 5G Band 8 (900 MHz), LTE or 5G Band 20 (800 MHz), LTE or 5G Band 25 (1900 MHz), LTE or 5G Band 28 (700 MHz), LTE or 5G Band 38 (2600 MHz), LTE or 5G Band 41 (2500 MHz), LTE or 5G Band 50 (1500 MHz), LTE or 5G Band 51 (1500 MHz), LTE or 5G Band 66 (1700 MHz), LTE or 5G Band 70 (2000 MHz), LTE or 5G Band 71 (600 MHz), LTE or 5G Band 74 (1500 MHz), LTE or 5G Band 77 (3500 MHz), 5G Band 257 (28 GHz), 5G Band 258 (24 GHz), 5G Band 260 (39 GHz), 5G Band 261 (28 GHz), and the like.

In some instances, frequency resources in the range of 600 MHz-6000 MHz can be referred as "low-band" and "mid-band." In some instances, the frequency resources may include "millimeter wave" bands including, but not limited to 24 GHz, 28 GHz, 39 GHz, 60 GHz, and the like. The techniques discussed herein are applicable to any frequency resources, and are not limited to those expressly recited above. For example, in some cases, frequency resources can include any licensed or unlicensed bands. Other examples of frequency resources may include those associated with $2^{nd}$ Generation (2G) radio access technologies, $3^{rd}$ Generation (3G) radio access technologies, and the like.

The systems, devices, and techniques described herein can reduce interference in a wireless network. Further, the techniques discussed herein can improve an overall throughput of a network by reducing an amount or size of a guard band in a network. Further, determining interference associated with a flexible portion of a wireless transmission may and/or receiving an identifier associated with an interfering signal may facilitate identifying interfering components to more accurately allocate wireless resources. In some cases, reducing interference can improve a quality of service (QoS) and/or a user experience associated with a wireless network. These and other improvements to the functioning of a computer and network are discussed herein.

The systems, devices, and techniques described herein can be implemented in a number of ways. In general, the techniques discussed herein may be implemented in any dual connectivity or multi connectivity environment, and are not limited to 2G, 3G, 4G, and/or 5G environments. In some examples, an LTE base station can be considered a master base station and an NR base station can be considered a secondary base station, and vice versa. In some instances, a core network can be represented as a 4G core network and/or a 5G core network. In some instances, the techniques can be implemented in standalone implementations (e.g., Option 1 and/or 2, as referred to by 3GPP) or in non-standalone implementations such as those referred to as Option 3, 4, 7, etc. by 3GPP. In some examples, the techniques discussed herein may be implemented outside a dual connectivity environment involving a single base station or network access technology and multiple bearers. Example implementations are provided below with reference to the following figures.

FIG. 1 illustrates an example environment 100 implementing interference detection and/or mitigation techniques according to implementations of the present disclosure.

As illustrated, the environment 100 includes a base station 102 in communication with a User Equipment (UE) 104 via connection 106. The terms "user equipment (UE)," "user device," "wireless communication device," "wireless device," "communication device," "mobile device," and "client device," can be used interchangeably to describe any UE (e.g., the UE 104) that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

Examples of UEs (e.g., the UE 104) can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

The base station 102 may be capable of transmitting and/or receiving data wirelessly using a first radio technology and a second radio technology. As used herein, the term "radio technology" can refer to a type, technique, specification, or protocol by which data is transmitted wirelessly.

In some cases, a radio technology can specify which frequency bands are utilized to transmit data. For instance, a "5G radio technology" can refer to the NR standard, as defined by 3GPP. In some cases, a "4G radio technology" can refer to the LTE radio standard, as defined by 3GPP.

In particular examples, the base station 102 can utilize a 4G radio technology. The base station 102 may transmit and receive data via the connection 106 (e.g., at least one LTE radio link) that is defined according to frequency bands included in, but not limited to, a range of 450 MHz to 5.9 GHz. In some instances, the frequency bands utilized for the base station 102 can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE band 48 (e.g., 3500 MHz), LTE Band 50 (1500 MHz), LTE Band 51 (1500 MHz), LTE Band 66 (1700 MHz), LTE Band 70 (2000 MHz), LTE Band 71 (e.g., a 600 MHz band), LTE Band 74 (1500 MHz), and the like. In some examples, the base station 102 can be, or at least include, an eNodeB.

In some instances, the base station 102 can also utilize a 5G radio technology, such as technology specified in the 5G NR standard, as defined by 3GPP. In certain implementations, the base station 102 can transmit and receive communications with devices over to the connection 106 (e.g., at least one NR radio link) that is defined according to frequency resources including but not limited to 5G Band 1 (e.g., 2080 MHz), 5G Band 2 (1900 MHz), 5G Band 3 (1800 MHz), 5G Band 4 (1700 MHz), 5G Band 5 (850 MHz), 5G Band 7 (2600 MHz), 5G Band 8 (900 MHz), 5G Band 20 (800 MHz), 5G Band 28 (700 MHz), 5G Band 38 (2600 MHz), 5G Band 41 (2500 MHz), NR Band 48 (e.g., 3500 MHz), 5G Band 50 (1500 MHz), 5G Band 51 (1500 MHz), 5G Band 66 (1700 MHz), 5G Band 70 (2000 MHz), 5G Band 71 (e.g., a 600 MHz band), 5G Band 74 (1500 MHz), 5G Band 257 (28 GHz), 5G Band 258 (24 GHz), 5G Band 260 (39 GHz), 5G Band 261 (28 GHz), and the like. In some embodiments, the base station 102 can be, or at least include, a gNodeB.

In some implementations, the base station 102 is part of a Non-Standalone (NSA) architecture. For instance, the base station 102 may include both a 4G transceiver (e.g., an eNodeB) by which the base station 102 can establish LTE radio link(s) and a 5G transceiver (e.g., a gNodeB) by which the base station 102 can establish NR radio link(s). In some cases, functions (e.g., transmission intervals, transmission power, etc.) of the 4G transceiver and the 5G transceiver are coordinated by the base station 102. In some examples, the base station 102 may include functionality to function as a Standalone (SA) architecture.

The base station 102 and/or the UE 104 may be capable of supporting 4G radio communications, such as LTE radio communications, and 5G radio communications, such as New Radio (NR) communications. In some examples, either or both of the base station 102 and the UE 104 may be configured to support at least one of enhanced Mobile Broadband (eMBB) communications, Ultra Reliable Low Latency Communications (URLLCs), or massive Machine Type Communications (mMTCs). In some instances, the one or more devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

The environment 100 further includes microwave backhaul transceivers 108 and 110. In some examples, the microwave backhaul transceivers 108 and 110 (also referred to as "transceivers") exchange data via a backhaul connection 112 (also referred to as a microwave backhaul communication). In some examples, the transceivers 108 and 110 may be associated with the base station 102 (e.g., the transceivers 108 and 110 may transmit data to and from the base station 102 to a core network via the connection 112). In some examples, the transceivers 108 and 110 can use a millimeter frequency for the connection 112 (e.g., 28 GHz), although any frequency can be used. In some examples, the connection 112 can represent a line-of-sight connection between the transceivers 108 and 110 and can exchange user plane and/or control plane data for a wireless network.

In some examples, the base station 102 may be associated with a first wireless provider and the transceivers 108 and 110 may be associated with a second wireless provider that is separate from the first wireless provider.

According to various implementations, the base station 102 and/or the transceivers 108 and 110 may communicate with a core network (not illustrated) that can include a 4G core network (e.g., an Evolved Packet Core (EPC)) and/or a 5G core network. Services may be relayed between the core network(s) and device(s) in the environment 100. In some cases, the core network can provide the services, in turn, to and from at least one Wide Area Network (WAN) (such as the Internet), an Internet Protocol (IP) Media Subsystem (IMS) network, and the like. In various implementations, the services can include voice services, data services, and the like.

As introduced above, components of a 4G core network may include one or more components implemented in accordance with 3GPP 4G specifications, including but not limited to a Mobility Management Entity (MME), a Serving Gateway (SGW), a Packet Data Network (PDN) Gateway (PGW), a Home Subscriber Server (HSS), an Access Network Discovery and Selection Function (ANDSF), an evolved Packet Data Gateway (ePDG), a Data Network (DN), and the like. Further, in some examples, components of a 5G core network may include any of an Access and Mobility Management Function (AMF), a Session Management Function (SMF), a Policy Control Function (PCF), an Application Function (AF), an Authentication Server Function (AUSF), a Network Slice Selection Function (NSSF), a Unified Data Management (UDM), a Network Exposure Function (NEF), a Network Repository Function (NRF), a User Plane Function (UPF), a DN and the like.

As illustrated in FIG. 1, each of the base station 102, the transceiver 108, and/or the transceiver 110 may comprise and/or may be associated with computing devices 114, 116, and 118, respectively. Each computing device 114, 116, and/or 118 may comprise an interference detection component 120 and an interference mitigation component 122.

In some examples, the interference detection component 120 can include functionality to detect interference from various components in the environment 100. For example, the interference detection component 120 can detect interference from the base station 102 at the transceiver 108 or 110; interference from the UE 104 at the transceiver 108 or 110; interference from the transceiver 108 or 110 at the UE 104; and/or interference from the transceiver 108 or 110 at the base station 102.

In some examples, the interference detection component 120 can detect, infer, or otherwise determine interference associated with location(s) of device(s) in an environment, as discussed in connection with FIGS. 1, 2, 3A, 3B, and 3C and throughout this disclosure.

For example, the base station 102 may be located at a distance 124 away from the microwave backhaul transceiver 108. In some examples, the base station 102 may be located perpendicular to the backhaul connection 112, as indicated by the symbol 126. That is, an angle formed by line segments based at least in part on the locations of the base station 102, the transceiver 108, and the transceiver 110 may correspond to a 90 degree angle (or may be within a threshold value of a 90 degree angle).

Further, the base station 102 may be located a distance 128 away from the microwave backhaul transceiver 110.

An angle 130 associated with the connection 106 represents an angular difference between the connection 106 and the connection 112.

A distance 132 represents a distance between the UE 104 and the microwave backhaul transceiver 110.

The interference detection component 120 can receive information about the topology of the devices in the environment 100 to determine whether interference is likely. In some examples, the computing device 114 can receive a prior coordination notice about different devices in an environment. Based on the location of the devices and/or on wireless resources used by such devices, the interference mitigation component 122 may implement mitigation techniques, as discussed herein.

In some examples, the interference detection component 120 may include a look up table or other interference models detailing expected interference based on various topologies. In some examples, such models can be based at least in part on measured interference levels measured while varying parameters (e.g., distances, angles, transmission power, channels, frequencies, guard band size, etc.).

For examples, if the distance 124, the distance 128, and/or the distance 132 is below one or more distance thresholds, and/or if the angle 130 is below an angle threshold, the interference detection component 120 can infer or determine that interference is likely to be present if a first frequency associated with the connection 106 is within a threshold frequency of a second frequency associated with the connection 112.

In some examples, the interference detection component 120 can detect interference associated with a flexible portion of a wireless transmission, as discussed in connection with FIG. 5 and throughout this disclosure.

In some examples, the interference detection component 120 can detect interference associated with an identifier included with a wireless transmission, as discussed in connection with FIG. 6 and throughout this disclosure.

In some examples, the interference mitigation component 122 can include functionality to mitigate interference by and between components in the environment 100. For example, the interference mitigation component 122 can mitigate interference by using techniques that may include selecting a wireless channel, initiating a handover to another radio access technology (e.g., handover from a 5G transmission to a Fourth Generation (4G) transmission), initiating a handover to another base station, and the like.

In some examples, the interference mitigation component 122 can mitigate interference using a variety of techniques, as discussed in connection with FIG. 4 and throughout this disclosure.

Figure 2:
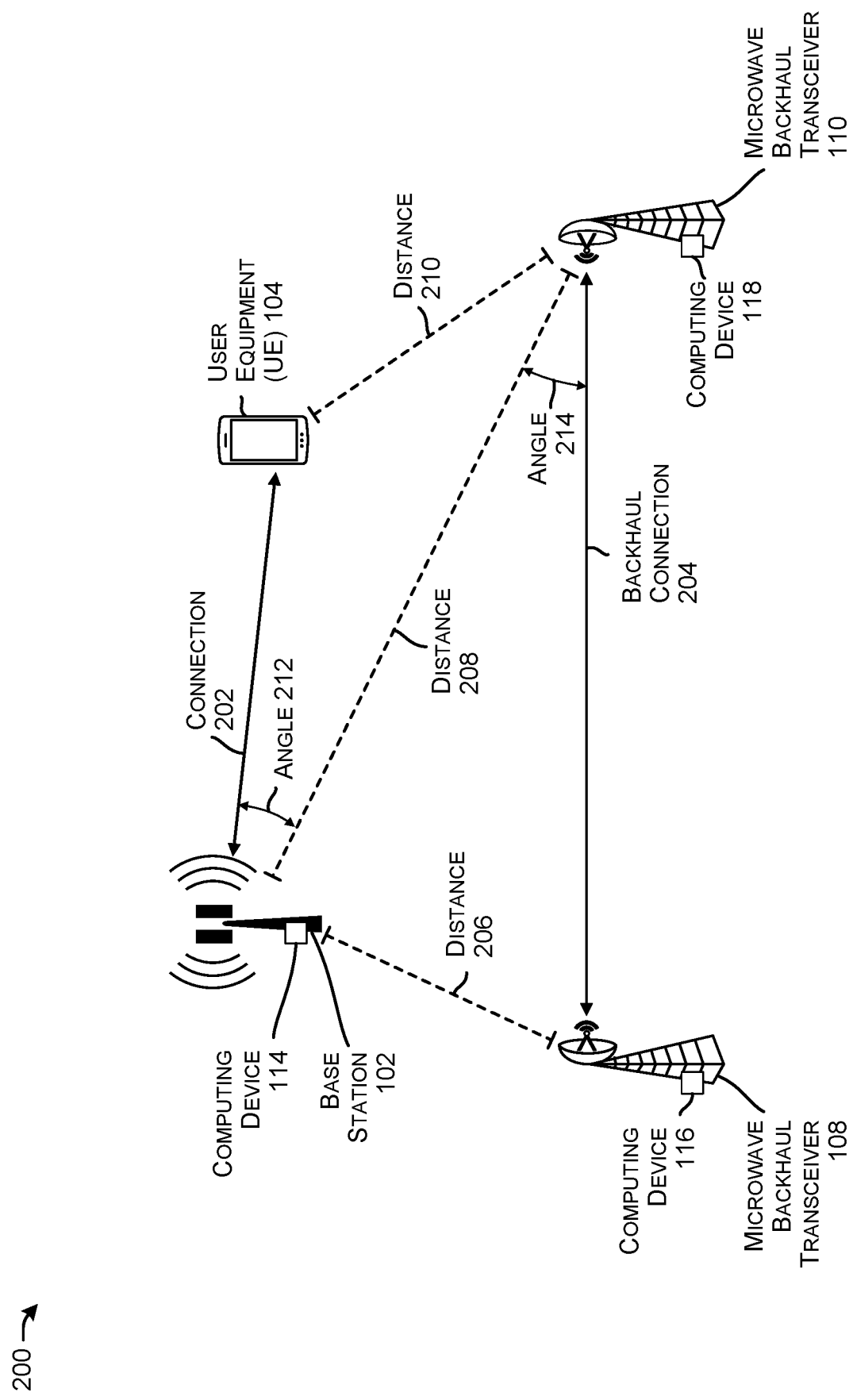
FIG. 2 illustrates an example of locations of components in a wireless network that may be associated with interference.

FIG. 2 illustrates an example 200 of locations of components in a wireless network that may be associated with interference. The example 200 illustrates a topology whereby an angle defined by locations associated with the base station 102, the microwave transceiver 108 and the microwave backhaul transceiver 110 does not form a 90 degree angle (or is outside of a threshold associated with a 90 degree angle).

The example 200 illustrates the base station 102 in communication with the UE 104 via a connection 202. The transceivers 108 and 110 are in communication via the connection 204.

A distance 206 represents the distance between the base station 102 and the transceiver 108. A distance 208 represents the distance between the base station 102 and the transceiver 110. A distance 210 represents the distance between the UE 104 and the transceiver 110.

An angle 212 represents an angle between the connection 202 and a line segment defined by a location of the base station 102 and the transceiver 110. And angle 214 represents an angle between the connection 204 and the line segment defined by the location of the base station 102 and the transceiver 110.

Although discussed in the context of the transceiver 110, angles and/or distances can be defined with respect to the transceiver 108.

Further, an aggregated angle can be based at least in part on the angle 212 and the angle 214. In some examples, an aggregated angle can comprise the sum of the angles 212 and 214. In some examples, an aggregated angle can comprise an average, maximum, minimum, or other statistical aggregation of the angles 212 and 214. In some examples, the angles 212, 214, and/or the aggregated angle can be evaluated with respect to one or more threshold angles to determine a likelihood of interference. Further, in some example, the distances 206, 208, and/or 210 can be evaluated with respect to one or more distance thresholds to determine a likelihood of interference. In some examples, an aggregated angle can also be referred to as a transmission angle difference representing a difference associated with transmission direction associated with the base station and/or the transceivers.

Figure 3A:
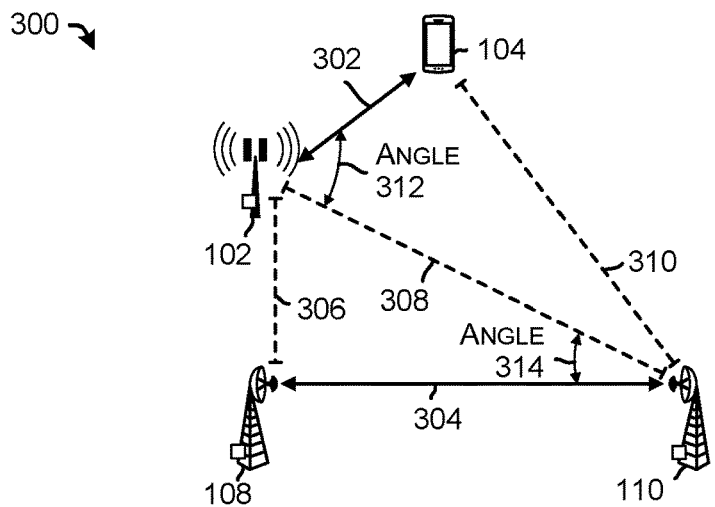
FIGS. 3A-3C illustrate various relationships between components of wireless networks and corresponding interference.
Figure 3B:
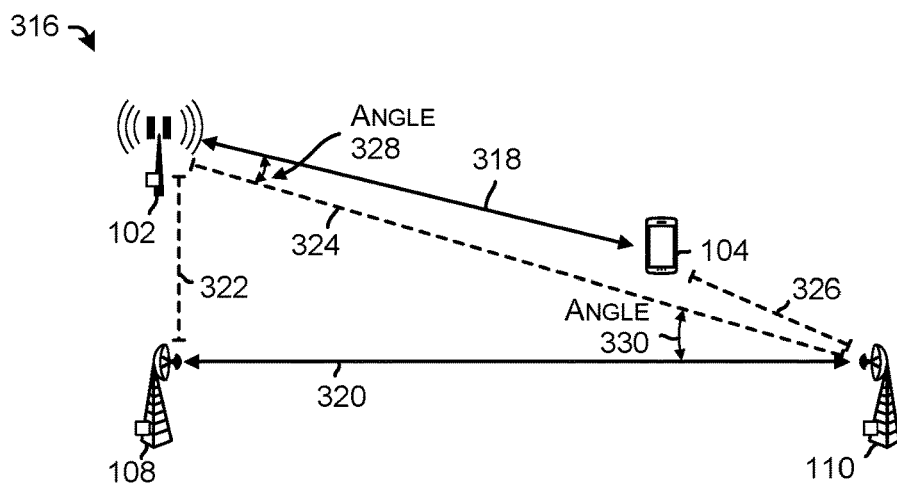
Figure 3C:
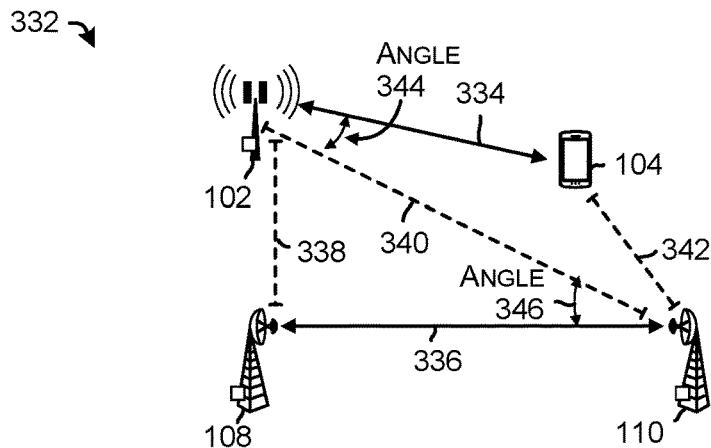

FIGS. 3A-3C illustrate various relationships between components of wireless networks and corresponding interference.

For example, FIG. 3A illustrates a first environment 300 where a distance between component is relatively low but an angle between transmissions is relatively high, which may result in low interference. For example, the environment 300 includes the base station 102 in communication with the UE 104 via a connection 302. The transceiver 108 is in communication with the transceiver 110 via a connection 304. A distance between the base station 102 and the transceiver 108 is represented as a distance 306. A distance between the base station 102 and the transceiver 110 is represented as a distance 308. A distance between the UE 104 and the transceiver 110 is represented as a distance 310. An angle associated with the connection 302 and a line segment defined by a location associated with the base station 102 and the transceiver 110 is represented as an angle 312. An angle associated with the connection 304 and the line segment is represented as an angle 314.

An aggregated angle can be based at least in part on the angles 312 and 314. For example, an aggregated angle can represent a sum of the angles 312 and 314.

In some examples, the interference detection component 120 can receive information about the distances 306, 308, and/or 310 and/or the angles 312, 314 and/or an aggregated angle to determine a likelihood of interference. Of course, the interference detection component 120 can receive information about a frequency associated with each of the connections 302 and 304, as well as power levels, modulation schemes, modulation, duplexing (e.g., time division duplexing (TDD), frequency division duplexing (FDD)), and the like.

In the example 300, the distances 306, 308, and/or 310 (either individually and/or aggregated) may be below a distance threshold, which might indicate a likelihood of interference. However, the angles 312, 314 and/or the aggregated angle may be above an angle threshold, which might indicate a low likelihood of interference. For the purposes of illustration, the example 300 may represent a topology whereby a low level of interference is associated with the connections 302 and/or 304.

FIG. 3B illustrates a second environment 316 where a distance between component is relatively high but an angle between transmissions is relatively low, which may result in low interference. For example, the environment 316 includes the base station 102 in communication with the UE 104 via a connection 318. The transceiver 108 is in communication with the transceiver 110 via a connection 320. A distance between the base station 102 and the transceiver 108 is represented as a distance 322. A distance between the base station 102 and the transceiver 110 is represented as a distance 324. A distance between the UE 104 and the transceiver 110 is represented as a distance 326. An angle associated with the connection 318 and a line segment defined by a location associated with the base station 102 and the transceiver 110 is represented as an angle 328. An angle associated with the connection 320 and the line segment is represented as an angle 330.

An aggregated angle can be based at least in part on the angles 328 and 330. For example, an aggregated angle can represent a sum of the angles 328 and 330.

In some examples, the interference detection component 120 can receive information about the distances 322, 324, and/or 326 and/or the angles 328, 330 and/or an aggregated angle to determine a likelihood of interference. Of course, the interference detection component 120 can receive information about a frequency associated with each of the connections 318 and 320, as well as power levels, modulation schemes, modulation, duplexing (e.g., time division duplexing (TDD), frequency division duplexing (FDD)), and the like.

In the example 316, the distances 322, 324, and/or 326 (either individually and/or aggregated) may be above a distance threshold, which might indicate a low likelihood of interference. However, the angles 328, 330 and/or the aggregated angle may be above an angle threshold, which might indicate a higher likelihood of interference. On balance, however, and for the purposes of illustration, the example 316 may represent a topology whereby a mid level of interference is associated with the connections 318 and/or 320.

FIG. 3C illustrates a third environment 332 where a distance between component is relatively low and an angle between transmissions is relatively low, which may result in interference. For example, the environment 332 includes the base station 102 in communication with the UE 104 via a connection 334. The transceiver 108 is in communication with the transceiver 110 via a connection 336. A distance between the base station 102 and the transceiver 108 is represented as a distance 338. A distance between the base station 102 and the transceiver 110 is represented as a distance 340. A distance between the UE 104 and the transceiver 110 is represented as a distance 342. An angle associated with the connection 334 and a line segment defined by a location associated with the base station 102 and the transceiver 110 is represented as an angle 344. An angle associated with the connection 336 and the line segment is represented as an angle 346.

An aggregated angle can be based at least in part on the angles 344 and 346. For example, an aggregated angle can represent a sum of the angles 344 and 346.

In some examples, the interference detection component 120 can receive information about the distances 338, 340, and/or 342 and/or the angles 344, 346 and/or an aggregated angle to determine a likelihood of interference. Of course, the interference detection component 120 can receive information about a frequency associated with each of the connections 334 and 336, as well as power levels, modulation schemes, modulation, duplexing (e.g., time division duplexing (TDD), frequency division duplexing (FDD)), and the like.

In the example 332, the distances 338, 340, and/or 342 (either individually and/or aggregated) may be below a distance threshold, which might indicate a likelihood of interference. Further, the angles 344, 346 and/or the aggregated angle may be above an angle threshold, which might indicate a low likelihood of interference. For the purposes of illustration, the example 332 may represent a topology whereby a high level of interference is associated with the connections 334 and/or 336.

In some examples, various levels of interference can be determined for various configurations of angles and/or distances. In some examples, a database of different topologies can be determined such that when similar or same conditions are presented in an environment an indication of interference can be determined.

In some examples, topology information can be provided to computing devices to determine interference information. For example, location information for each of the devices can be received at a computing device (e.g., the computing devices 114, 116, and/or 118) or may be inferred based on signal triangulation, beam angle (e.g., associated with the connection between the base station 102 and the UE 104), GPS information, and the like.

Figure 4:
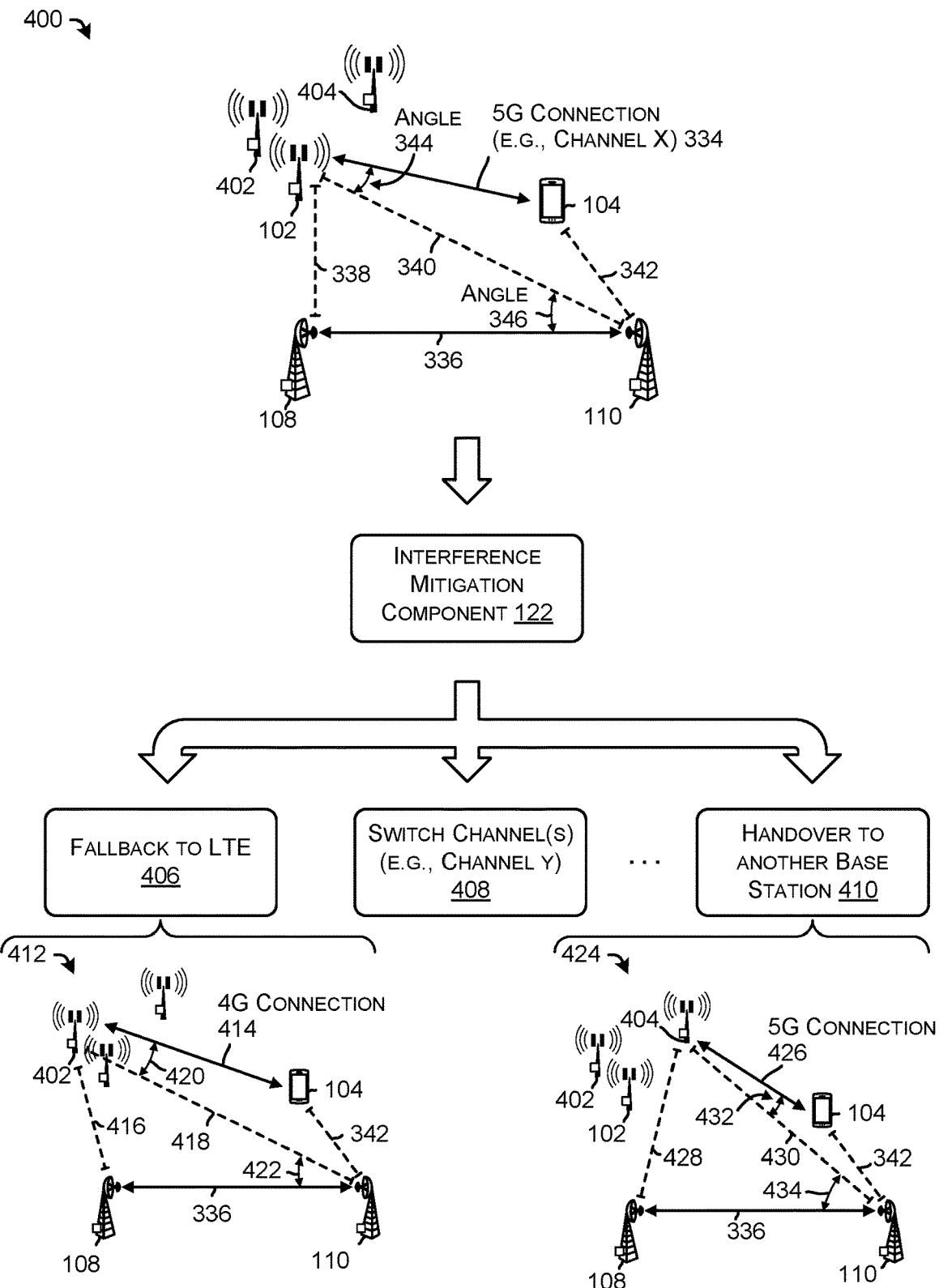
FIG. 4 illustrates an example of interference in a wireless network and example techniques for mitigating the interference.

FIG. 4 illustrates an example 400 of interference in a wireless network and example techniques for mitigating the interference. The example 400 illustrates an environment comprising the base station 102 in communication with the UE 104 via the connection 334. In some examples, the connection 334 is a 5G connection associated with a particular channel (e.g., channel X). The environment includes transceivers 108 and 110 in communication via the connection 336. As discussed in connection with FIG. 3C, the environment in the example 400 may represent a layout where interference may be present in the connections 334 and 336.

The example also illustrates base stations 402 and 404. In this example, the base station 402 is a 4G base station co-located with the base station 102, while the base station 404 is a 5G base station located away from the base station 102.

As discussed herein, the interference mitigation component 122 may receive information about a layout or topology of devices in an environment as well as wireless resources associated with such devices. For example, the interference mitigation component 122 can be informed of distances, angles, wireless resources (e.g., frequencies, channels, capabilities (e.g., whether devices are capable of 4G and/or 5G communications), locations of other devices (e.g., the base stations 402, 404, and the like), signal characteristics (e.g., RSRP, RSRQ, SINR, throughput, latency, QCI, QOS, bit rate, modulation scheme, duplexing scheme, beam direction, beam width, power levels, and the like).

Based at least in part on layout information, the interference mitigation component 122 can perform an action to mitigate interference at the base station 102, the UE 104, the transceiver 108, and/or the transceiver 110.

For example, mitigation actions may include, but are not limited to, a fallback to LTE action 406, a switch channel(s) action 408 (e.g., to channel Y), a handover to another base station action 410, and the like.

In some examples, the fallback to LTE action 406 may include changing the connection 334 from a 5G connection to a LTE connection (e.g., via an RRC reconfiguration message). An example 412 illustrates a result of the action 406 in which the base station 402 is communicating with the UE 104 via a 4G connection 414. By falling back to LTE (with may represent a low band or mid band frequency), the connection 414 may not use a same or similar frequency resource as the connection 336, which may reduce interference in the environment. In a case where the base station 402 is co-located with the base station 102 the distances and angles between the various components may be substantially the same as the example 400.

However, where the base station 402 is not co-located with the base station 102, a distance between the base station 402 and the transceiver 108 may be represented as a distance 416. A distance between the base station 402 and the transceiver 110 may be represented as a distance 418. An angle associated with the connection 414 and a line segment defined by a location associated with the base station 402 and the transceiver 110 may be represented as an angle 420. An angle associated with the connection 336 and the line segment may be represented as an angle 422.

In some examples, the switch channel(s) action 408 may include instructing the base station 102, the UE 104, and/or the transceivers 108 and 110 to use a different channel (e.g., channel Y) to introduce a guard band between the connections 334 and 336. In some examples, a preference (e.g., priority) may be given to the connection 336 to not adjust a channel of the connection 336. In some examples, a preference (e.g., a priority) may be given to the connection 334 to not adjust a channel of the connection 334.

In some examples, the handover to another base station action 410 may include handing over the UE 104 from the base station 102 as a serving cell to another base station (e.g., 404) as the serving cell.

An example 424 illustrates the environment following the action 410. For example, the base station 404 is communicating with the UE 104 via a 5G connection 426. In some examples, handing over to another base station may alter the distances and/or angles of components in the environment.

For example, a distance between the base station 404 and the transceiver 108 may be represented as a distance 428. A distance between the base station 404 and the transceiver 110 may be represented as a distance 430. An angle associated with the connection 426 and a line segment defined by a location associated with the base station 404 and the transceiver 110 may be represented as an angle 432. An angle associated with the connection 336 and the line segment may be represented as an angle 434.

In some examples, one or more actions may be used together to further reduce interference associated with a serving base station, a UE, and a microwave backhaul transceiver.

In some examples, additional actions may include, but are not limited to, varying one or more of a power level, beam direction, beam angle, modulation scheme, bit rate, QoS, QCI, radio access technology, channel, servicing cell, standalone/non-standalone connections, and the like.

Figure 5:
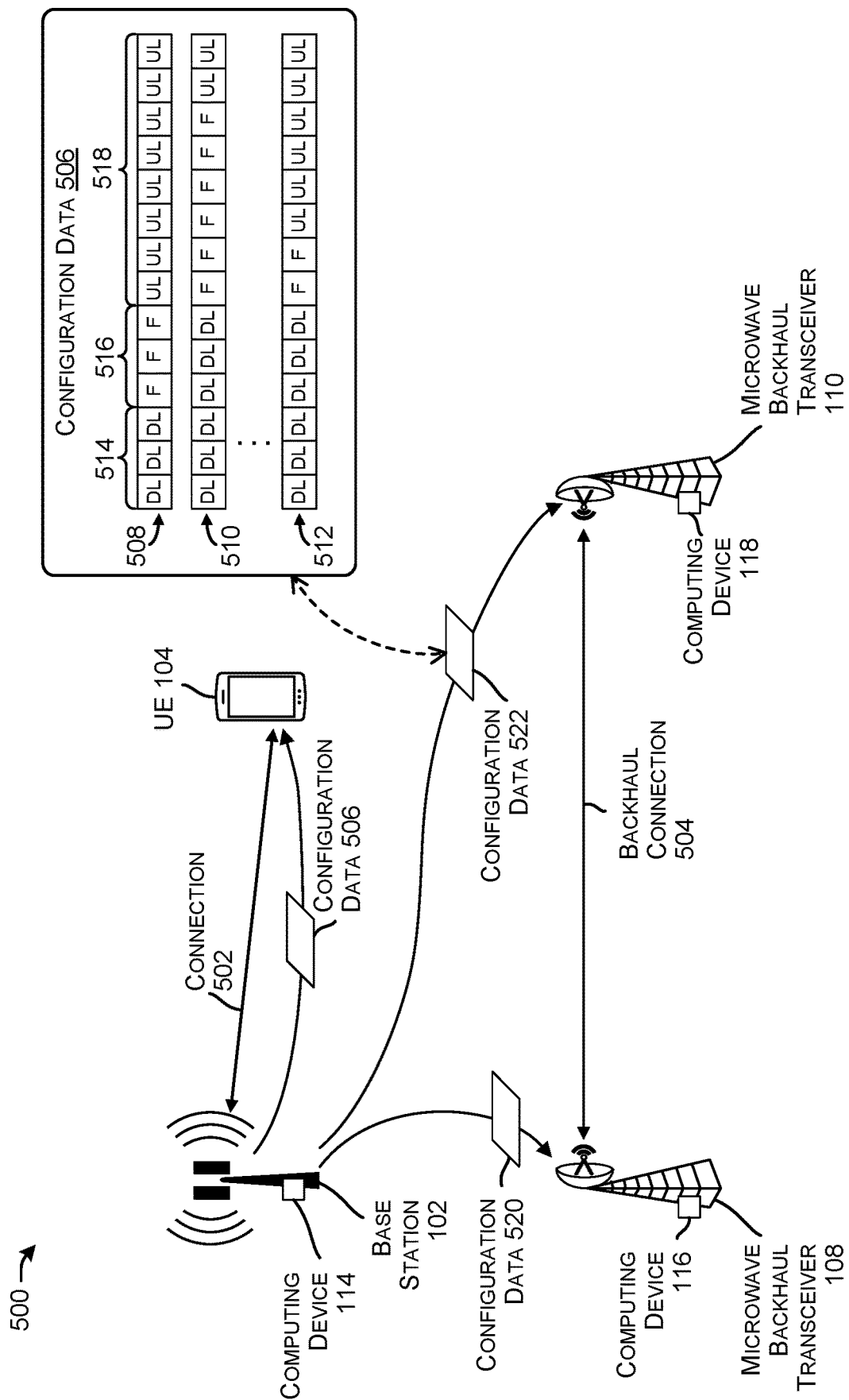
FIG. 5 illustrates example techniques for detecting interference in connection with a flexible portion associated with a wireless transmission.

FIG. 5 illustrates an environment 500 including example techniques for detecting interference in connection with a flexible portion associated with a wireless transmission.

The environment 500 illustrates the base station 102 in communication with the UE 104 via a connection 502. The transceivers 108 and 110 are in communication via a connection 504.

In some examples, the base station 102 can send configuration data 506 to the UE 104. In some examples, the configuration data 506 can include information regarding a slot format for the UE 104 and the base station 102 to use in the connection 502. By way of example, and without limitation, example slot formats are illustrated as examples 508, 510, and 512. In particular, the slot format in the example 508 includes a downlink portion 514 (comprising three downlink slots), a flexible portion 516 (comprising three flexible slots), and an uplink portion 518 (comprising eight uplink slots). Examples of slot configurations are given in 3GPP Technical Specification 38.213, Table 11.1.1-1.

In some examples, the base station 102 can transmit the configuration data 506 to the UE 104 such that the connection 502 can be configured in accordance with the configuration data 506. Further, the configuration data 506 can be received at the computing device 114, at the computing device 116 (as configuration data 520), and/or at the computing device 118 (as configuration data 522).

Accordingly, each computing device 114, 116, and/or 118 can listen for signals in accordance with the configuration data 506, 520, and/or 522 such that a signal received during the flexible portion (e.g., 516) at the computing device 114 can be determined to be interference. In some examples, operations can further include determining a center frequency associated with any potential interference, a power level, a modulation scheme, an identifier, and the like. In the case where interference is received at the computing device 114 during the flexible portion 516, the computing device 114 can determine that the transceivers 108 and/or 110 are a likely source of the interference and can mitigate the interference in accordance with the techniques discussed herein.

Figure 6:
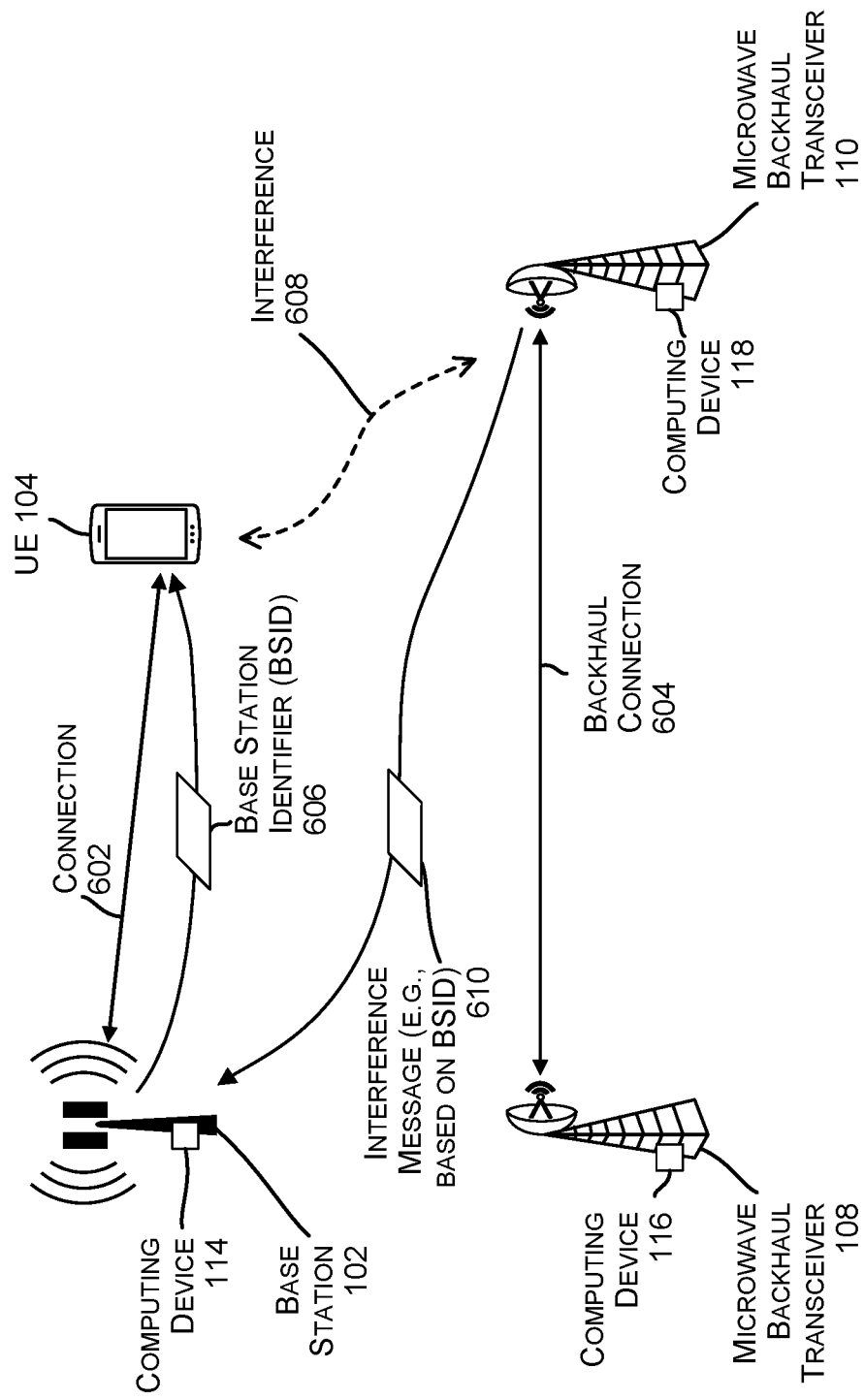
FIG. 6 illustrates example techniques for identifying interference in a network based on an identifier included in a wireless transmission.

FIG. 6 illustrates an environment 600 including example techniques for identifying interference in a network based on an identifier included in a wireless transmission.

The environment 600 illustrates the base station 102 in communication with the UE 104 via a connection 602. The transceivers 108 and 110 are in communication via a connection 604.

In some examples, the base station 102 can send a base station identifier (BSID) 606 to the UE 104 for the UE 104 to include in an uplink portion of the connection 602. That is, the UE 104 can receive the BSID 606 and can transmit an identifier with data to the base station 102 as per the connection 602. In some examples, a portion of a transmission from the UE 104 can be received by the transceiver 110 and/or the computing device 118 as interference 608. In response, the computing device 118 can receive the interference 608, decode the signal to determine the BSID, and can send an interference message 610 to the computing device 114. In some examples, the interference message 610 can inform the computing device 114 that interference is being received at the transceiver 110, and accordingly, the computing device 114 can implement interference mitigation actions as discussed herein.

In some examples, the transceivers 108 and 110 may include a transceiver identifier in a backhaul communication such that the computing device 114 can receive the transceiver identifier as interference and can provide an interference message to the transceivers 108 and 110, for example.

Figure 7:
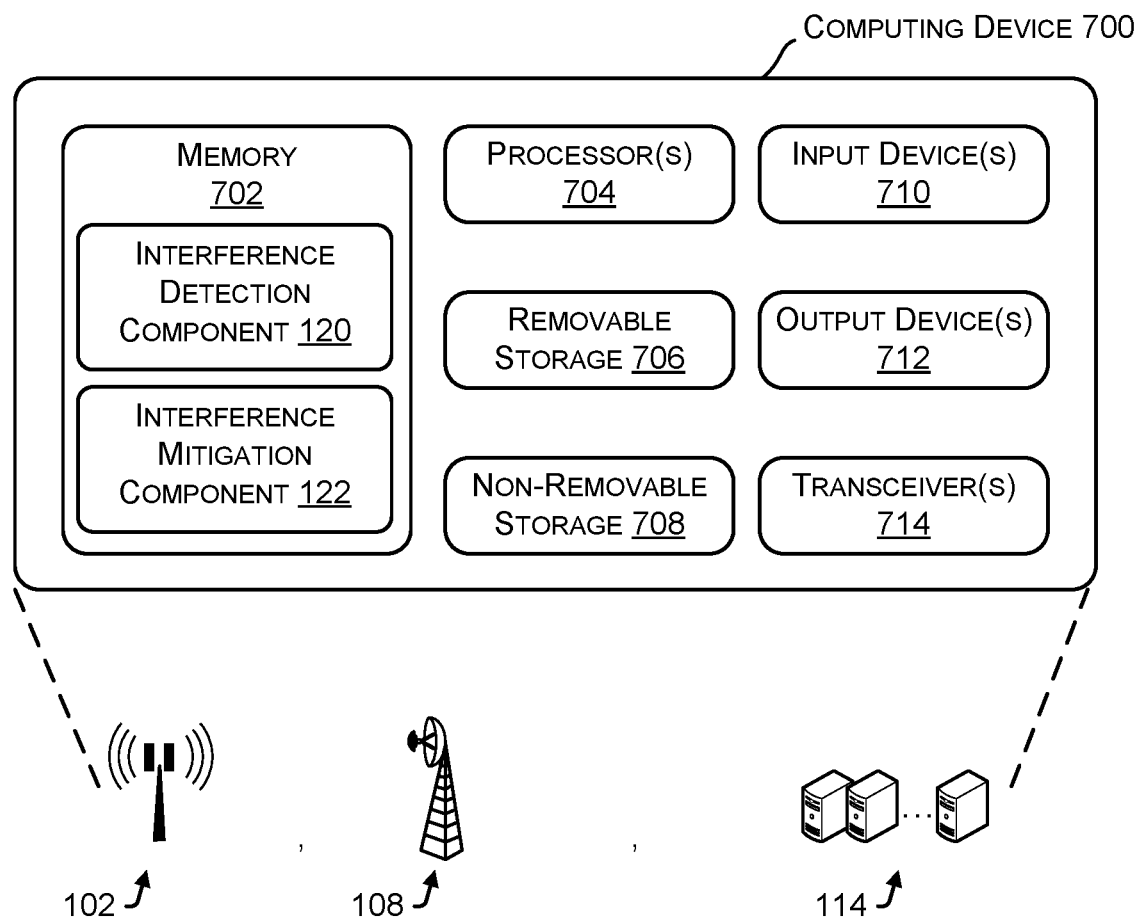
FIG. 7 illustrates an example computing device to implement the interference detection and/or mitigation techniques, as described herein.

FIG. 7 illustrates an example computing device 700 to implement the interference detection and/or mitigation techniques, as described herein. In some embodiments, the computing device 700 can correspond to the base station 102, the transceiver 108, the computing device 114, and the like. It is to be understood in the context of this disclosure that the computing device 700 can be implemented as a single device, as a plurality of devices, or as a system with components and data distributed among them.

As illustrated, the computing device 700 comprises a memory 702 storing the interference detection component 120 and the interference mitigation component 122 discussed herein. Also, the computing device 700 includes processor(s) 704, a removable storage 706 and non-removable storage 708, input device(s) 710, output device(s) 712, and transceiver(s) 714.

In various embodiments, the memory 702 is volatile (such as RAM), non-volatile (such as ROM, flash memory, etc.) or some combination of the two. The interference detection component 120 and the interference mitigation component 122 stored in the memory 702 can comprise methods, threads, processes, applications or any other sort of executable instructions. The interference detection component 120 and the interference mitigation component 122 can also include files and databases.

In general, and as described herein, the interference detection component 120 can include functionality to infer, predict, detect, or otherwise determine a presence of interference by and between component in an environment. For example, the interference detection component 120 can determine interference based on distance(s) and/or angle(s) between components in a network, based on a signal received during a flexible portion of a wireless transmission, and/or based on an identifier associated with a transmission. Aspects of the interference detection component 120 are discussed throughout this disclosure.

In general, and as described herein, the interference mitigation component 122 can include functionality to alter one or more wireless resources of a base station, a UE, and/or one or more microwave backhaul transceivers to reduce interference in a system. For examples, mitigation techniques may include, but are not limited to, varying one or more wireless resources of the microwave backhaul transceiver, the base station, and/or the UE, including but not limited to a wireless channel (e.g., changing channels to introduce a guard band (or to increase a size of a guard band) between transmissions), a radio access technology (e.g., handing over from a 5G base station at a location to a 4G base station at the same location), a serving cell (e.g., handing over from a first base station associated with a first location to a second base station associated with a second location), varying a power or modulation scheme, and the like. Aspects of the interference mitigation component 122 are discussed throughout this disclosure.

In some embodiments, the processor(s) 704 is a central processing unit (CPU), a graphics processing unit (GPU), or both CPU and GPU, or other processing unit or component known in the art. In some configurations, the processing service (and/or any components discussed herein) may be provided by one or more servers of the wireless communication network. In some configurations, the processing service may be part of a network of computing resources, e.g., a "cloud" network.

The computing device 700 also includes additional data storage devices (removable and/or non-removable) such as, for example, magnetic disks, optical disks, or tape. Such additional storage is illustrated in FIG. 7 by removable storage 706 and non-removable storage 708. Tangible computer-readable media can include volatile and non-volatile, removable and non-removable media implemented in any method or technology for storage of information, such as computer readable instructions, data structures, program modules, or other data. The memory 702, the removable storage 706 and the non-removable storage 708 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the computing device 700. Any such tangible computer-readable media can be part of the computing device 700.

The computing device 700 may be configured to communicate over a telecommunications network using any common wireless and/or wired network access technology. Moreover, the computing device 700 may be configured to run any compatible device operating system (OS), including but not limited to, Microsoft Windows Mobile, Google Android, Apple iOS, Linux Mobile, as well as any other common device OS.

The computing device 700 also can include input device(s) 710, such as a keypad, a cursor control, a touch-sensitive display, voice input device, etc., and output device(s) 712 such as a display, speakers, printers, etc. These devices are well known in the art and need not be discussed at length here.

As illustrated in FIG. 7, the computing device 700 also includes one or more wired or wireless transceiver(s) 714. For example, the transceiver(s) 714 can include a network interface card (NIC), a network adapter, a LAN adapter, or a physical, virtual, or logical address to connect to various networks, devices, or components illustrated in the environment 400, for example. To increase throughput when exchanging wireless data, the transceiver(s) 714 can utilize multiple-input/multiple-output (MIMO) technology. The transceiver(s) 714 can comprise any sort of wireless transceivers capable of engaging in wireless, radio frequency (RF) communication. The transceiver(s) 714 can also include other wireless modems, such as a modem for engaging in Wi-Fi, WiMAX, Bluetooth, infrared communication, and the like.

Figure 8:
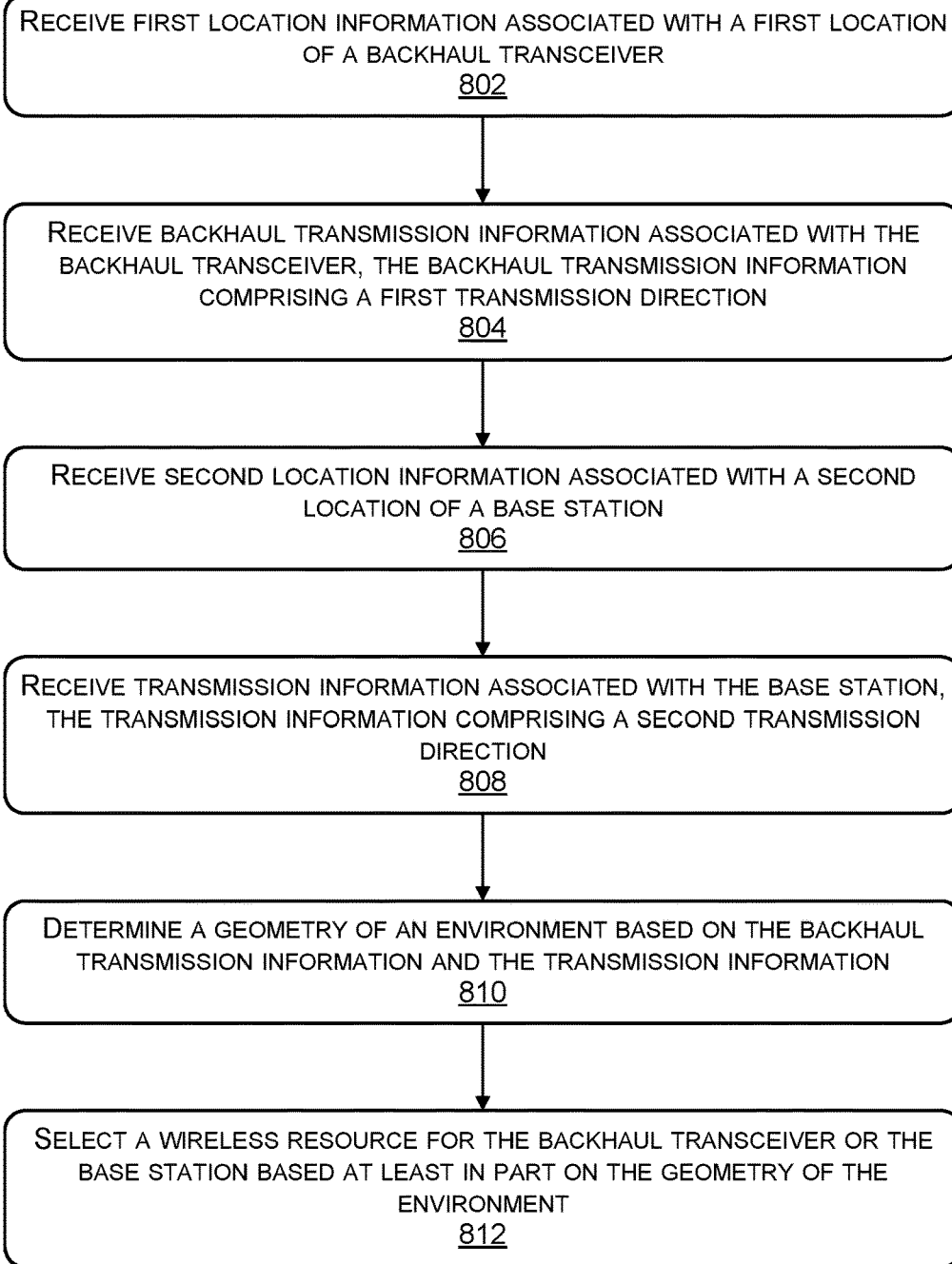
FIG. 8 illustrates an example process for selecting a wireless resource based at least in part on a geometry of components in a wireless network.
Figure 9:
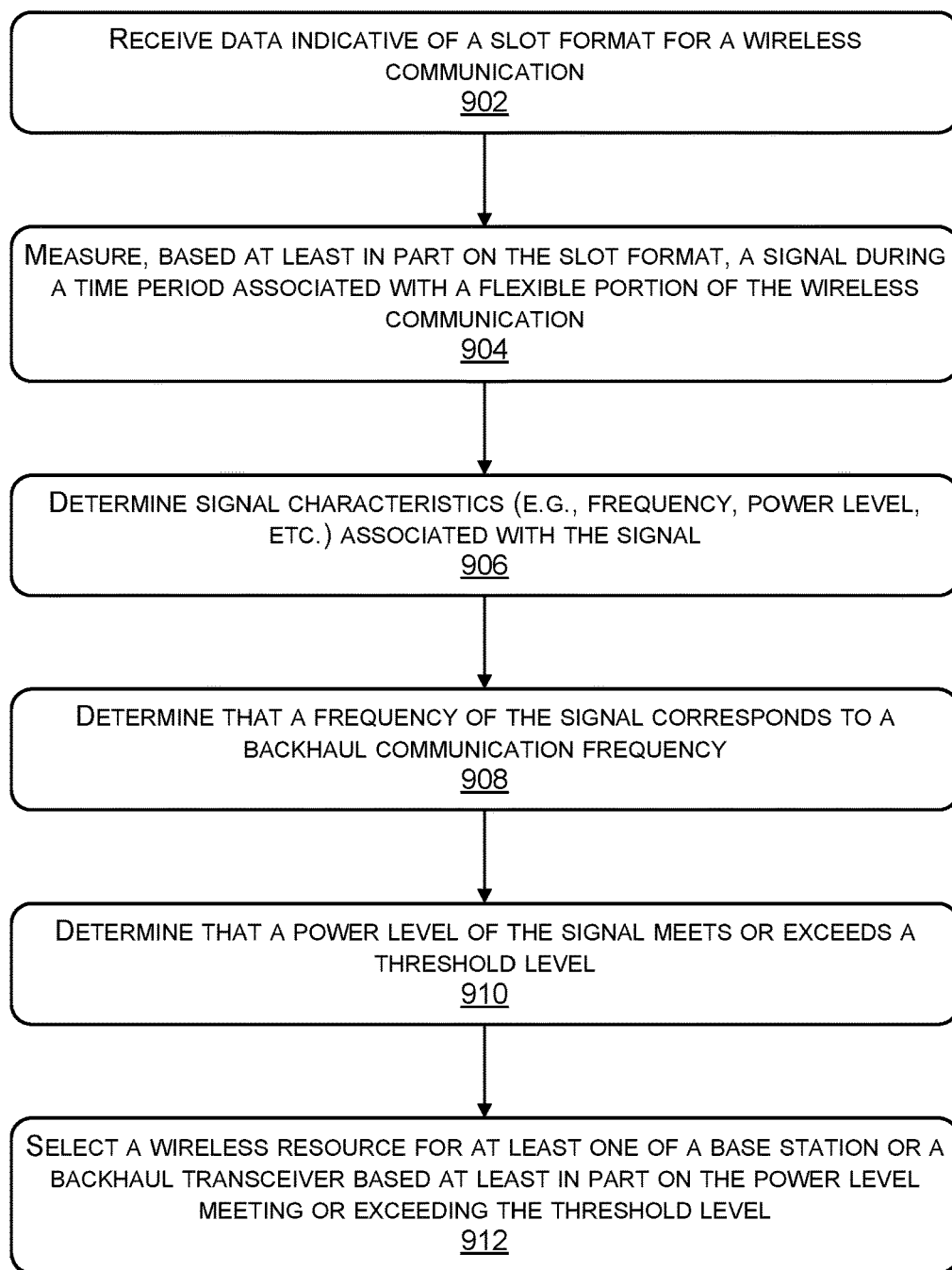
FIG. 9 illustrates an example process for detecting interference based at least in part on a flexible portion associated with a wireless transmission.

FIGS. 8-10 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 8 illustrates an example process 800 for selecting a wireless resource based at least in part on a geometry of components in a wireless network, as described herein. The example process 800 can be performed by the interference detection component 120, the interference mitigation component 122, or another component, in connection with other components and/or devices discussed herein. Some or all of the process 800 can be performed by one or more devices or components in the environments discussed herein.

At operation 802, the process can include receiving first location information associated with a first location of a backhaul transceiver. In some examples, a backhaul transceiver may correspond to the transceivers 108 and/or 110, as discussed herein. In some examples, the operation 802 can include receiving a prior coordination notice (PCN) describing a location and/or wireless resources associated with the transceivers.

At operation 804, the process can include receiving backhaul transmission information associated with the backhaul transceiver, the backhaul transmission information comprising a first transmission direction. In some examples, the first transmission direction may be based at least in part on a transceiver pair, such as the transceivers 108 and 110. In some examples, transmission information may include an indication of a frequency used, a modulation or duplexing scheme used, transmission power, beam width, bit rate, bandwidth, priority, and the like.

At operation 806, the process can include receiving second location information associated with a second location of a base station. In some examples, the base station may correspond to the base station 102, as discussed herein. In some examples, the operation 806 can include receiving a prior coordination notice (PCN) describing a location and/or wireless resources associated with the base station. In some examples, the operation 806 may further include receiving location information associated with a UE served by the base station.

At operation 808, the process can include receiving transmission information associated with the base station, the transmission information comprising a second transmission direction. In some examples, the second transmission direction may be associated with a connection between the base station and a UE. In some examples, the second transmission direction may be associated with a beam angle.

At operation 810, the process can include determining a geometry of an environment based on the backhaul transmission information and the transmission information. In some examples, the operation 810 can include determining distance(s) and/or angle(s) between the base station(s), UE(s), transceiver(s), and the like. In some examples, the operation 810 can include accessing distance thresholds, angle thresholds, and/or interference models to determine expected or predicted levels of interference based on the geometry of the environment.

At operation 812, the process can include selecting a wireless resource for the backhaul transceiver or the base station based at least in part on the geometry of the environment. In some examples, the operation 812 may include falling back to LTE, selecting another channel (for the base station and/or transceivers), handing over to another base station (e.g., with a more favorable geometry), and the like. Additional examples of mitigation actions are discussed throughout this disclosure.

FIG. 9 illustrates an example process for detecting interference based at least in part on a flexible portion associated with a wireless transmission, as described herein. The example process 900 can be performed by the interference detection component 120, the interference mitigation component 122, or another component, in connection with other components and/or devices discussed herein. Some or all of the process 900 can be performed by one or more devices or components in the environments discussed herein.

At operation 902, the process can include receiving data indicative of a slot format for a wireless communication. In some examples, the data can indicate a downlink portion, a flexible portion, and/or an uplink portion. In some examples, a slot format can be in accordance with 3GPP Technical Specification 38.213, Table 11.1.1-1. In some examples, the slot format can be transmitted by a base station to a UE, a transceiver, and/or computing devices associated with the various components of a network.

At operation 904, the process can include measuring, based at least in part on the slot format, a signal during a time period associated with a flexible portion of the wireless communication. For example, a signal received during the flexible portion of the wireless communication can be determined to be interference based on the signal not arriving during a downlink portion or uplink portion.

At operation 906, the process can include determining signal characteristics (e.g., frequency, power level, etc.) associated with the signal. For example, the operation 906 can include determining a RSSI, SING, RSRP, RSRQ, and the like, as appropriate.

At operation 908, the process can include determining that a frequency of the signal corresponds to a backhaul communication frequency. For example, for a sensor or computing device associated with a base station, a signal received during the flexible portion can be determined to be interference. The operation 908 can further include determining a center frequency associated with the signal to determine if the signal is associated with a channel similar to a channel used for a communication between the base station and a UE.

At operation 910, the process can include determining that a power level of the signal meets or exceeds a threshold level. In some examples, the threshold level can be statically or dynamically determined based on priority, communication type (e.g., QCI, application type, etc.), environmental conditions, and the like.

At operation 912, the process can include selecting a wireless resource for at least one of a base station or a backhaul transceiver based at least in part on the power level meeting or exceeding the threshold level. In some examples, the operation 912 may include falling back to LTE, selecting another channel (for the base station and/or transceivers), handing over to another base station (e.g., with a more favorable geometry), and the like. Additional examples of mitigation actions are discussed throughout this disclosure.

FIG. 10 illustrates an example process for detecting and mitigating interference in a wireless network, as described herein. The example process 1000 can be performed by the interference detection component 120, the interference mitigation component 122, or another component, in connection with other components and/or devices discussed herein. Some or all of the process 1000 can be performed by one or more devices or components in the environments discussed herein.

At operation 1002, the process can include determining interference associated with at least one of a base station, a user equipment, and/or a backhaul transceiver. In some examples, the operation 1002 can be based at least in part on one or more of distance(s) and/or angle(s) associated with components and transmission directions in a network, signals associated with a flexible portion, identifiers associated with a signal received as interference, and the like.

At operation 1004, the process can include mitigating the interference by modifying at least one radio characteristic (e.g., a radio access technology, a wireless channel, an encoding scheme, a power level, a serving base station, etc.)

Thus, the techniques described herein may provide an improved user experience by detecting and/or mitigating interference in wireless networks. In some examples, the operation 1004 may include falling back to LTE, selecting another channel (for the base station and/or transceivers), handing over to another base station (e.g., with a more favorable geometry), and the like. Additional examples of mitigation actions are discussed throughout this disclosure.

Example Clauses

A: A system comprising: one or more processors; a memory; and one or more components stored in the memory and executable by the one or more processors to perform operations comprising: receiving first location information associated with a first location of a backhaul transceiver; receiving backhaul transmission information associated with the backhaul transceiver, the backhaul transmission information comprising a first transmission direction; receiving second location information associated with a second location of a base station; receiving transmission information associated with the base station, the transmission information comprising a second transmission direction; determining a distance between the first location and the second location; determining that the distance is less than a threshold distance; determining an angle between the first transmission direction and the second transmission direction; determining that the angle is within a threshold angle; and selecting, based at least in part on the distance being below the threshold distance and the angle being below the threshold angle, a wireless channel for at least one of the backhaul transceiver or the base station.

B: The system of paragraph A, wherein: the backhaul transceiver comprises a microwave backhaul; and the base station comprises a Fifth Generation (5G) base station.

C: The system of paragraph B, wherein: the microwave backhaul is associated with a 28 GHz frequency; and the 5G base station is associated with at least one of Band 257 or Band 261.

D: The system of any of paragraphs A-C, wherein the threshold angle is based at least in part on the distance.

E: The system of any of paragraphs A-D, wherein selecting the wireless channel comprises sending an instruction to the base station to establish a Fourth Generation (4G) communication with a user equipment.

F: The system of any of paragraphs A-E, wherein the base station is a first base station, and wherein selecting the wireless channel comprises sending an instruction to the first base station to hand over a user equipment to a second base station.

G: The system of any of paragraphs A-F, the operations further comprising: determining, based at least in part on the angle and the distance, a guard band associated with at least one of the backhaul transceiver or the base station.

H: The system of any of paragraphs A-G, the operations further comprising: determining a first angle between the first transmission direction and a line segment defined by the first location and the second location; and determining a second angle between the second transmission direction and the line segment; wherein determining the angle between the first transmission direction and the second transmission direction is based at least in part on the first angle and the second angle.

I: A method comprising: receiving first location information associated with a first location of a backhaul transceiver; receiving backhaul transmission information associated with the backhaul transceiver, the backhaul transmission information comprising a first transmission direction; receiving second location information associated with a second location of a base station; receiving transmission information associated with the base station, the transmission information comprising a second transmission direction, determining a distance between the first location and the second location; determining a transmission angle difference based at least in part on the first transmission direction and the second transmission direction; and selecting, based at least in part on the distance and the transmission angle difference, a wireless resource for at least one of the backhaul transceiver or the base station.

J: The method of paragraph I, wherein the second transmission direction is associated with a wireless communication between the base station and a user equipment.

K: The method of paragraph I or J, wherein the wireless resource comprises at least one of: a wireless channel associated with the base station or the backhaul transceiver; a transmission power level associated with the base station or the backhaul transceiver; a modulation scheme associated with the base station or the backhaul transceiver; a radio access technology associated with the wireless communication; or a serving base station associated with the wireless communication.

L: The method of any of paragraphs I-K, further comprising: determining a first angle between the first transmission direction and a line segment based at least in part on the first location and the second location; and determining a second angle between the second transmission direction and the line segment; wherein determining the transmission angle difference is based at least in part on the first angle and the second angle.

M: The method of any of paragraphs I-L, wherein: the backhaul transceiver comprises a microwave backhaul; and the base station comprises a Fifth Generation (5G) base station and a Fourth Generation (4G) base station.

N: The method of paragraph M, wherein: the microwave backhaul is associated with a 28 GHz frequency; and the 5G base station is associated with at least one of Band 257 or Band 261.

O: A non-transitory computer-readable medium storing instructions that, when executed, cause one or more processors to perform operations comprising: receiving first location information associated with a first location of a backhaul transceiver; receiving backhaul transmission information associated with the backhaul transceiver, the backhaul transmission information comprising a first transmission direction; receiving second location information associated with a second location of a base station; receiving transmission information associated with the base station, the transmission information comprising a second transmission direction, determining a distance between the first location and the second location; determining a transmission angle difference based at least in part on the first transmission direction and the second transmission direction; and selecting, based at least in part on the distance and the transmission angle difference, a wireless resource for at least one of the backhaul transceiver or the base station.

P: The non-transitory computer-readable medium of paragraph O, wherein the second transmission direction is associated with a wireless communication between the base station and a user equipment.

Q: The non-transitory computer-readable medium of paragraph O or P, wherein the wireless resource comprises at least one of: a wireless channel associated with the base station or the backhaul transceiver; a transmission power level associated with the base station or the backhaul transceiver; a modulation scheme associated with the base station or the backhaul transceiver; a radio access technology associated with the wireless communication; or a serving base station associated with the wireless communication.

R: The non-transitory computer-readable medium of any of paragraphs O-Q, further comprising: determining a first angle between the first transmission direction and a line segment based at least in part on the first location and the second location; and determining a second angle between the second transmission direction and the line segment; wherein determining the transmission angle difference is based at least in part on the first angle and the second angle.

S: The non-transitory computer-readable medium of any of paragraphs O-R, wherein selecting the wireless resource for at least one of the backhaul transceiver or the base station is based at least in part on at least one of: the distance being below a threshold distance; or the transmission angle difference being below a threshold angle.

T: The non-transitory computer-readable medium of any of paragraphs O-S, wherein: the backhaul transceiver comprises a microwave backhaul; and the base station comprises a Fifth Generation (5G) base station and a Fourth Generation (4G) base station.

U: A system comprising: one or more processors; a memory; and one or more components stored in the memory and executable by the one or more processors to perform operations comprising: receiving data indicative of a slot format for a wireless communication associated with a base station, the slot format comprising an uplink portion, a flexible portion, and a downlink portion; measuring a signal during a time period associated with the flexible portion of the wireless communication; determining at least a frequency and a power level associated with the signal; determining that the frequency corresponds to a microwave backhaul communication frequency; determining that the power level meets or exceeds a threshold power level; and selecting a wireless channel for at least one of the base station or a microwave backhaul transceiver based at least in part on the power level meeting or exceeding the threshold power level.

V: The system of paragraph U, wherein the wireless communication is associated with the base station and a user equipment, the operations further comprising: receiving, from the user equipment, interference information determined by the user equipment; wherein selecting the wireless channel is further based at least in part on the interference information.

W: The system of paragraph U or V, the operations further comprising: sending an instruction to a user equipment for the user equipment to include an identifier associated with the base station in the uplink portion of the wireless communication.

X: The system of paragraph W, the operations further comprising: receiving an indication that the identifier was detected by a sensor associated with the microwave backhaul transceiver; wherein selecting the wireless channel is further based at least in part on the indication.

Y: The system of paragraph X, wherein the identifier is received as interference at the sensor associated with the microwave backhaul transceiver.

Z: The system of any of paragraphs U-Y, wherein: the microwave backhaul transceiver is associated with a 28 GHz frequency; and the base station is associated with at least one of Band 257 or Band 261.

AA: The system of any of paragraphs U-Z, wherein the signal is received as interference at a device associated with the base station.

AB: A method comprising: receiving data indicative of a slot format for a wireless communication, the slot format comprising at least a flexible portion; measuring a signal during a time period associated with the flexible portion of the wireless communication; determining a signal characteristic associated with the signal; determining that the signal characteristic corresponds to a microwave backhaul communication; determining that a power level associated with the signal meets or exceeds a threshold power level; and selecting a wireless resource for at least one of a base station or a backhaul transceiver based at least in part on the power level meeting or exceeding the threshold power level.

AC: The method of paragraph AB, further comprising: selecting the wireless resource further based at least in part on the signal characteristic corresponding to the microwave backhaul communication.

AD: The method of paragraph AB or AC, wherein the signal is received as interference at a device associated with the base station.

AE: The method of any of paragraphs AB-AD, wherein the wireless resource comprises at least one of: a wireless channel associated with the base station or the backhaul transceiver; a transmission power level associated with the base station or the backhaul transceiver; a modulation scheme associated with the base station or the backhaul transceiver; a radio access technology associated with the wireless communication; or a serving base station associated with the wireless communication.

AF: The method of any of paragraphs AB-AE, wherein the wireless communication is associated with the base station and a user equipment, the method further comprising: receiving, from the user equipment, interference information associated with the user equipment; wherein selecting the wireless resource is further based at least in part on the interference information.

AG: The method of any of paragraphs AB-AF, further comprising: sending an instruction to a user equipment for the user equipment to include an identifier associated with the base station in an uplink portion of the wireless communication.

AH: The method of paragraph AG, further comprising: receiving an indication that the identifier was detected by a device associated with the backhaul transceiver; wherein selecting the wireless resource is further based at least in part on the indication.

AI: The method of any of paragraphs AB-AH, wherein: the backhaul transceiver is associated with a 28 GHz frequency; and the base station is associated with at least one of Band 257 or Band 261.

AJ: A non-transitory computer-readable medium storing instructions that, when executed, cause one or more processors to perform operations comprising: receiving data indicative of a slot format for a wireless communication, the slot format comprising at least a flexible portion; measuring a signal during a time period associated with the flexible portion of the wireless communication; determining a signal characteristic associated with the signal; determining that the signal characteristic corresponds to a microwave backhaul communication; determining that a power level associated with the signal meets or exceeds a threshold power level; and selecting a wireless resource for at least one of a base station or a backhaul transceiver based at least in part on the power level meeting or exceeding the threshold power level.

AK: The non-transitory computer-readable medium of paragraph AJ, the operations further comprising: selecting the wireless resource further based at least in part on the signal characteristic corresponding to the microwave backhaul communication.

AL: The non-transitory computer-readable medium of paragraph AJ or AK, wherein the wireless resource comprises at least one of: a wireless channel associated with the base station or the backhaul transceiver; a transmission power level associated with the base station or the backhaul transceiver; a modulation scheme associated with the base station or the backhaul transceiver; a radio access technology associated with the wireless communication; or a serving base station associated with the wireless communication.

AM: The non-transitory computer-readable medium of any of paragraphs AJ-AL, wherein the wireless communication is associated with the base station and a user equipment, the operations further comprising: receiving, from the user equipment, interference information associated with the user equipment; wherein selecting the wireless resource is further based at least in part on the interference information.

AN: The non-transitory computer-readable medium of any of paragraphs AJ-AM, the operations further comprising: sending an instruction to a user equipment for the user equipment to include an identifier associated with the base station in an uplink portion of the wireless communication.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system comprising:
one or more processors;
a memory; and
one or more components stored in the memory and executable by the one or more processors to perform operations comprising:
receiving first location information associated with a first location of a backhaul transceiver;
receiving first transmission information associated with the backhaul transceiver, the first transmission information comprising a first transmission direction;
receiving second location information associated with a second location of a base station;
receiving second transmission information associated with the base station, the second transmission information comprising a second transmission direction;
determining a distance between the first location and the second location;

determining that the distance is less than a threshold distance;
determining an angle between the first transmission direction and the second transmission direction;
determining that the angle is less than a threshold angle; and
selecting, based at least in part on the distance being less than the threshold distance and the angle being less than the threshold angle, a wireless channel for at least one of the backhaul transceiver or the base station.

2. The system of claim 1, wherein:
the backhaul transceiver comprises a microwave backhaul; and
the base station comprises a Fifth Generation (5G) base station.

3. The system of claim 2, wherein:
the microwave backhaul is associated with a 28 GHz frequency; and
the 5G base station is associated with at least one of Band 257 or Band 261.

4. The system of claim 1, wherein the threshold angle is based at least in part on the distance.

5. The system of claim 1, wherein selecting the wireless channel comprises sending an instruction to the base station to establish a Fourth Generation (4G) communication with a user equipment.

6. The system of claim 1, wherein the base station is a first base station, and wherein selecting the wireless channel comprises sending an instruction to the first base station to hand over a user equipment to a second base station.

7. The system of claim 1, the operations further comprising:
determining, based at least in part on the angle and the distance, a guard band associated with at least one of the backhaul transceiver or the base station.

8. The system of claim 1, the operations further comprising:
determining a first angle between the first transmission direction and a line segment defined by the first location and the second location; and
determining a second angle between the second transmission direction and the line segment;
wherein determining the angle between the first transmission direction and the second transmission direction is based at least in part on the first angle and the second angle.

9. A method comprising:
receiving first location information associated with a first location of a backhaul transceiver;
receiving first transmission information associated with the backhaul transceiver, the first transmission information comprising a first transmission direction;
receiving second location information associated with a second location of a base station;
receiving second transmission information associated with the base station, the second transmission information comprising a second transmission direction;
determining a distance between the first location and the second location;
determining that the distance is less than a threshold distance;
determining a transmission angle difference based at least in part on the first transmission direction and the second transmission direction;
determining that the transmission angle difference is less than a threshold angle; and
selecting, based at least in part on the distance being less than the threshold distance and the transmission angle difference being less than the threshold angle, a wireless resource for at least one of the backhaul transceiver or the base station,
wherein the wireless resource comprise at least one of a wireless channel, a transmission power level, a modulation scheme, or a radio access technology.

10. The method of claim 9, wherein the second transmission direction is associated with a wireless communication between the base station and a user equipment.

11. The method of claim 9, wherein the wireless resource further comprises an indication of
a serving base station to be associated with the base station.

12. The method of claim 9, further comprising:
determining a first angle between the first transmission direction and a line segment, the line segment based at least in part on the first location and the second location; and
determining a second angle between the second transmission direction and the line segment.

13. The method of claim 9, wherein:
the backhaul transceiver comprises a microwave backhaul; and
the base station comprises a Fifth Generation (5G) base station and a Fourth Generation (4G) base station.

14. The method of claim 13, wherein:
the microwave backhaul is associated with a 28 GHz frequency; and
the 5G base station is associated with at least one of Band 257 or Band 261.

15. One or more non-transitory computer-readable medium storing instructions that, when executed, cause one or more processors to perform operations comprising:
receiving first location information associated with a first location of a backhaul transceiver;
receiving first transmission information associated with the backhaul transceiver, the first transmission information comprising a first transmission direction;
receiving second location information associated with a second location of a base station;
receiving second transmission information associated with the base station, the second transmission information comprising a second transmission direction;
determining a distance between the first location and the second location;
determining that the distance is less than a threshold distance;
determining a transmission angle difference based at least in part on the first transmission direction and the second transmission direction;
determining that the transmission angle difference is less than a threshold angle; and
selecting, based at least in part on the distance being less than the threshold distance and the transmission angle difference being less than the threshold angle, a wireless resource for at least one of the backhaul transceiver or the base station,
wherein the wireless resource comprise at least one of a wireless channel, a transmission power level, a modulation scheme, or a radio access technology.

16. The one or more non-transitory computer-readable medium of claim 15, wherein the second transmission direction is associated with a wireless communication between the base station and a user equipment.

17. The one or more non-transitory computer-readable medium of claim 15, wherein the wireless resource comprises an indication of
a serving base station to be associated with the base station.

18. The one or more non-transitory computer-readable medium of claim 15, further comprising:
determining a first angle between the first transmission direction and a line segment, the line segment based at least in part on the first location and the second location; and
determining a second angle between the second transmission direction and the line segment.

19. The non-transitory computer-readable medium of claim 15, wherein:
the backhaul transceiver comprises a microwave backhaul; and
the base station comprises a Fifth Generation (5G) base station and a Fourth Generation (4G) base station.

\* \* \* \* \*